US011156251B2

(12) United States Patent
Nastasi et al.

(10) Patent No.: US 11,156,251 B2
(45) Date of Patent: Oct. 26, 2021

(54) LABYRINTH SEALING DEVICE FOR IMPROVED DRAINAGE

(71) Applicant: Aktiebolaget SKF, Gothenburg (SE)

(72) Inventors: Antonia Nastasi, Turin (IT); Paolo A Re, Nichelino (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/795,775

(22) Filed: Feb. 20, 2020

(65) Prior Publication Data

US 2020/0332836 A1 Oct. 22, 2020

(30) Foreign Application Priority Data

Apr. 16, 2019 (IT) .......................... 102019000005776

(51) Int. Cl.
*F16C 33/78* (2006.01)
*B60B 27/00* (2006.01)
*F16C 33/72* (2006.01)
*F16C 33/80* (2006.01)
*F16C 19/08* (2006.01)
*F16C 19/18* (2006.01)

(52) U.S. Cl.
CPC ...... *F16C 33/7823* (2013.01); *B60B 27/0073* (2013.01); *F16C 33/726* (2013.01); *F16C 33/805* (2013.01); *F16C 19/08* (2013.01); *F16C 19/186* (2013.01); *F16C 2326/02* (2013.01)

(58) Field of Classification Search
CPC .. F16C 33/726; F16C 33/782; F16C 33/7823; F16C 33/7869; F16C 33/7873; F16C 33/7876; F16C 33/7886; F16C 33/805; F16C 2326/02; B60B 27/0073
See application file for complete search history.

(56) References Cited

U.S. PATENT DOCUMENTS

| 9,683,662 | B2 * | 6/2017 | Kanzaki ................ F16C 33/805 |
| 9,956,820 | B2 * | 5/2018 | Gulli .................... B60B 27/0073 |
| 10,119,571 | B2 * | 11/2018 | Seno ................... F16C 33/7886 |

(Continued)

FOREIGN PATENT DOCUMENTS

| DE | 212014000153 U1 | 2/2016 |
| DE | 102017110087 A1 | 11/2017 |

(Continued)

*Primary Examiner* — James Pilkington
(74) *Attorney, Agent, or Firm* — Garcia-Zamor Intellectual Property Law; Ruy Garcia-Zamor; Bryan Peckjian

(57) ABSTRACT

A sealing device for a bearing unit having an axis of rotation and providing; a static component placed on a non-rotatable outer ring having a reinforcement support that abuts the outer ring and elastomeric material disposed on the reinforcement support, the elastomeric material forming first and second lips; a rigid shield configured for placement on one of a rotatable hub and a rotatable inner ring; the first and second lips have an equilibrium position where they do not contact the metallic shield; the elastomeric material forming a third lip that contacts the rigid shield to form an internal volume of the sealing device, the second lip and the rigid shield define a labyrinth seal in communication with the internal volume; the second lip, does not extend a full three hundred sixty degrees around the axis of rotation. This creates a channel for drainage of contaminants from the internal volume.

10 Claims, 6 Drawing Sheets

DET. Y

(56) References Cited

U.S. PATENT DOCUMENTS

| | | | | |
|---|---|---|---|---|
| 10,479,139 B2 * | 11/2019 | Tada | ................ | B60B 27/0073 |
| 10,746,229 B2 * | 8/2020 | Lim | ................ | F16C 33/7833 |
| 2013/0127119 A1 * | 5/2013 | Haepp | ................ | F16C 33/7863 |
| | | | | 277/351 |

FOREIGN PATENT DOCUMENTS

| | | | |
|---|---|---|---|
| DE | 102010064672 | * | 10/2019 |
| EP | 2947358 A1 | | 11/2015 |
| FR | 3018321 | * | 12/2016 |
| JP | 3268711 B2 | | 3/2002 |
| JP | 2016080141 A | | 5/2016 |
| KR | 20130057347 A | | 5/2013 |

* cited by examiner

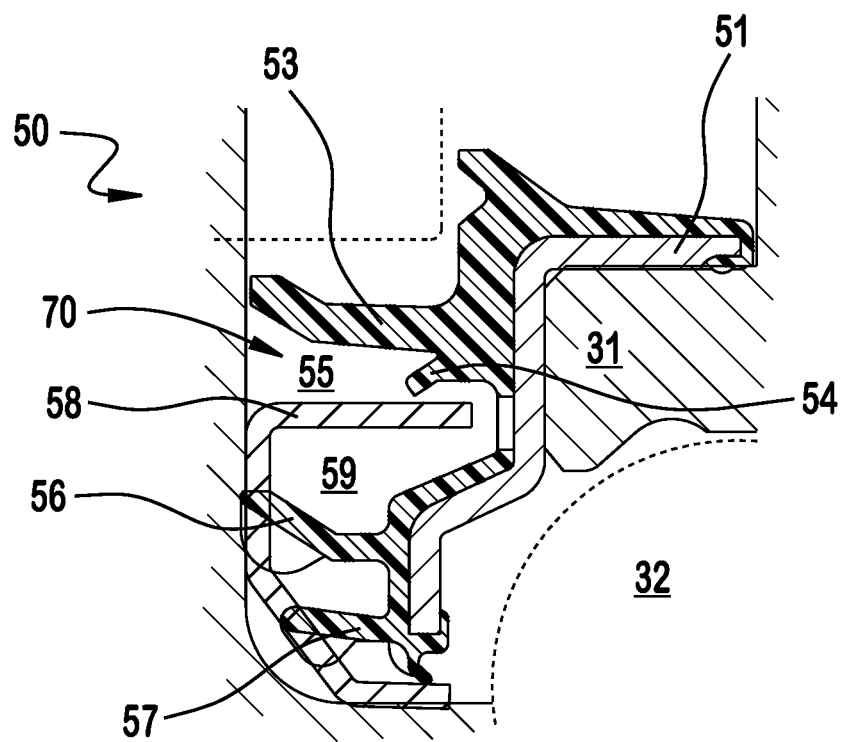
FIG. 2A - DET. Y
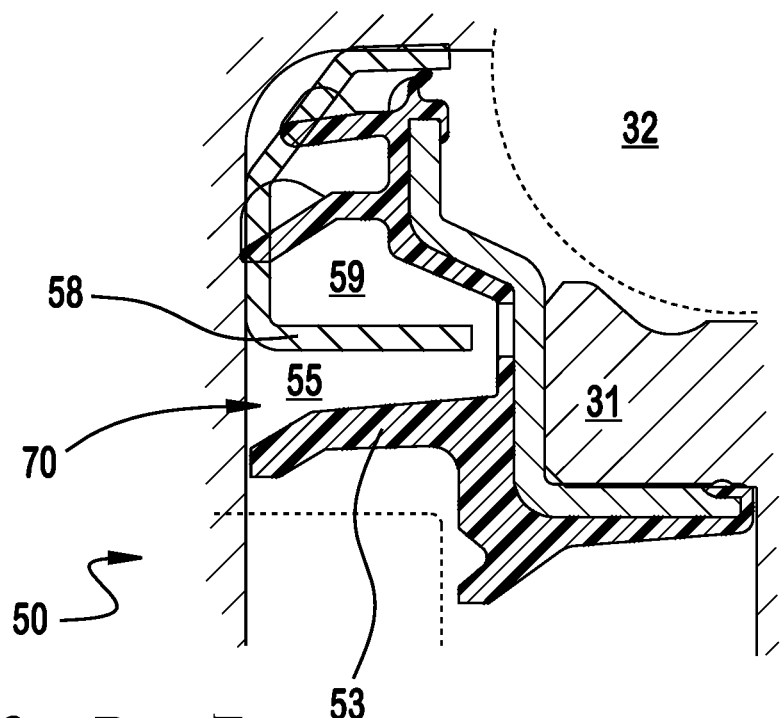
FIG. 2B - DET. Z

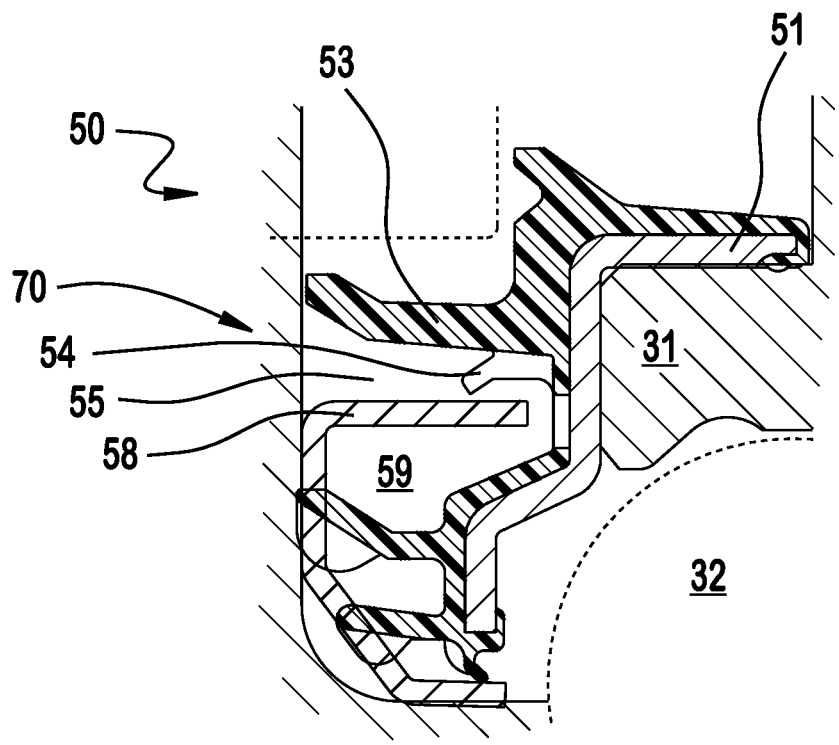
FIG. 3 - DET. Y
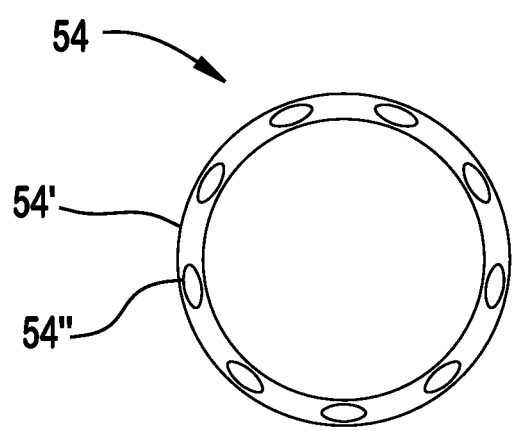
FIG. 4A

LABYRINTH SEALING DEVICE FOR IMPROVED DRAINAGE

CROSS-REFERENCE TO RELATED APPLICATIONS

This application claims priority to Italian Patent Application no. 102019000005776, filed Apr. 16, 2019, the contents of which are fully incorporated herein by reference.

TECHNICAL FIELD OF THE INVENTION

The present invention relates to a cassette sealing device having innovative features which allow improved drainage therefrom of the contaminants which have penetrated inside the sealing device. Such a sealing device is applied to a bearing unit. The present invention is suitable in particular, although not exclusively, for the wheel hub assemblies of motor vehicles, the assemblies being provided with a bearing unit. More particularly, the bearing units according to the invention are those in which the outer ring of the bearing is stationary, while the inner ring of the bearing is rotatable. This invention is applicable, advantageously but not exclusively, to a bearing unit having a double row of balls.

BACKGROUND OF THE INVENTION

Bearing units are generally exposed to contaminants of various types, for example mud, dust and suspended particulate matter and/or particles in a solution. Therefore, bearing units, including those forming part of wheel hub assemblies for motor vehicles, need to be provided with suitable sealing devices.

The sealing devices according to the prior art are two-part cassette seals, comprising a rotating portion, mounted on the radially inner ring, and a stationary portion, mounted on the radially outer ring. According to the prior art, the stationary portion of the seal comprises one or more lips made of elastomeric material making contact with the rotating portion and ensuring the sealing action with respect to the inside of the bearing unit.

Both during on-road operating conditions and during validation of the bearing unit, in order to optimize the sealing performance of the bearing unit and at the same time maintain low friction levels, it is known that a labyrinth seal design represents the best compromise. The labyrinth seal is designed using a shield which protects the seal opening from a moving part of the motor vehicle (for example the brake disk) and a non-contacting sealing lip. In this way it is difficult for the mud and the other contaminants to penetrate into the bottom chamber of the seal. At the same time, however, should mud accumulate inside the chamber, its drainage becomes problematic.

Tests have shown that normally the accumulation of mud occurs precisely inside that chamber, namely in the bottom part of the radially outer ring. The accumulation of mud, which the water also present is unable to remove, is a drawback which reduces the working life of the wheel hub assembly, resulting in faster wear of the lips of the seals and preventing correct operation of the entire bearing unit.

In order to overcome this drawback, a known solution is that of providing a drainage hole in the upright of the vehicle suspension. This solution, unfortunately, does not solve the aforementioned problem: for design reasons the drainage hole may be provided only on the axially inner side of the bearing unit and, although it facilitates drainage in that zone, it certainly does not manage to solve the problem on the axially outer side of the bearing unit.

There therefore exists the need to design a sealing device which does not have the aforementioned drawbacks.

SUMMARY OF THE INVENTION

The object of the present invention is to provide a sealing device, for example for a bearing unit of a wheel hub assembly, the device being provided both with a shielding function in respect of external contaminants and with a geometrical form which favours the drainage of the albeit limited flow of contaminants which have penetrated inside the sealing device. In particular, in order to reduce to a minimum the accumulation of mud which can be seen on the bottom side of the radially outer ring, according to the present invention the circumferential extension of a non-contacting lip which performs the labyrinth sealing function is interrupted in order to allow improved drainage.

On the one hand, this novel solution is still able to ensure that there is an effective labyrinth seal for preventing the introduction of mud and other contaminants inside the bearing unit. On the other hand, the labyrinth solution must be such as to ensure that the mud, water and contaminants which have penetrated inside the sealing device are not prevented from flowing out and, to achieve this, its circumferential extension must be optimized and in any case limited to an angular opening smaller than 360 degrees. In this way the water may easily wash away any mud which could accumulate inside or at worst allow the accumulation of only a negligible amount of mud.

According to one aspect of the present invention a sealing device according to the characteristic features indicated in the attached independent claim is described.

According to another aspect of the present invention a wheel hub assembly having a bearing unit provided with the sealing device according to the present invention is also described.

Further preferred and/or particularly advantageous embodiments of the invention are described in accordance with the characteristic features indicated in the attached dependent claims.

BRIEF DESCRIPTION OF THE DRAWINGS

The invention will now be described with reference to the attached drawings which illustrate a number of non-limiting examples of embodiment thereof, in which:

FIG. 2a is a detail of the top part of the sealing device according to a first embodiment of the present invention;

FIG. 2b is a detail of the bottom part of the sealing device according to FIG. 2a;

FIG. 3 is a detail of the sealing device according to a second embodiment of the present invention; and FIGS. 4A-4F shows a non-contacting lip of the sealing device according to FIG. 3.

DETAILED DESCRIPTION OF THE INVENTION

Purely by way of a non-limiting example, the present invention will now be described with reference to a wheel hub assembly for motor vehicles, provided with a bearing unit having a sealing device according to the present invention.

Figure 1:
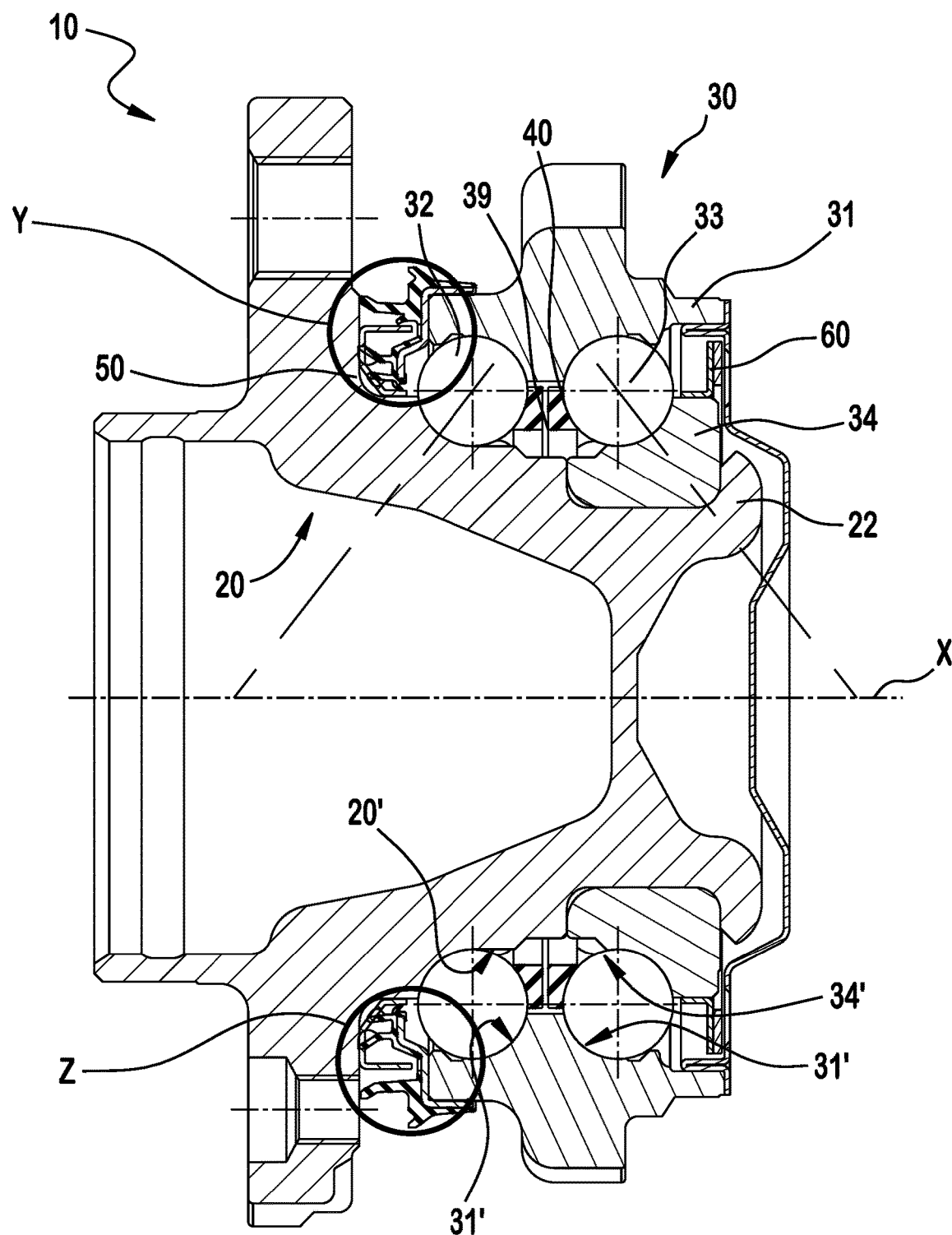
FIG. 1 is a partially cross-sectioned view of a wheel hub assembly provided with a labyrinth sealing device.
Figure 4B:
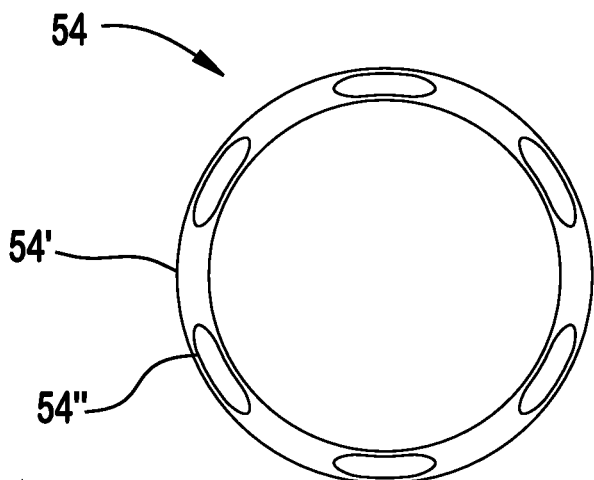
Figure 4C:
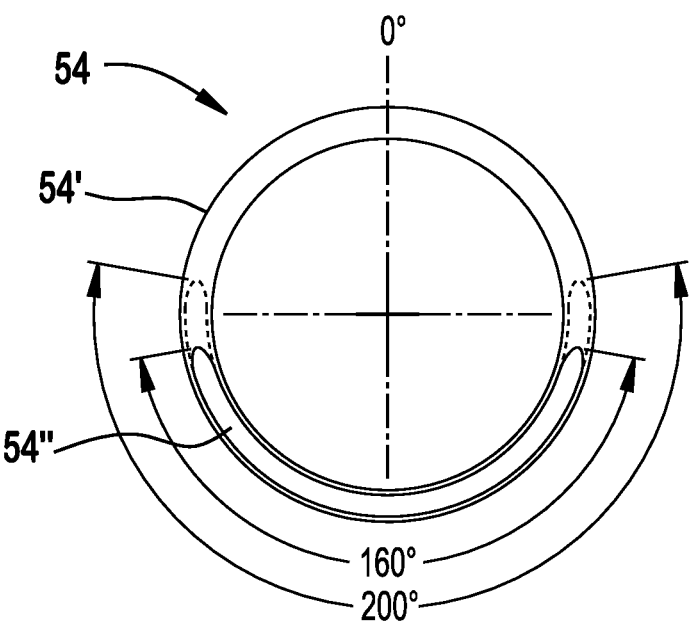
Figure 4D:
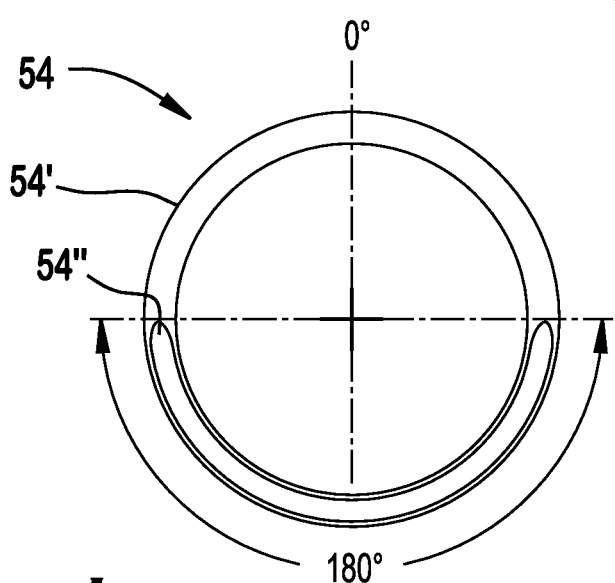
Figure 4E:
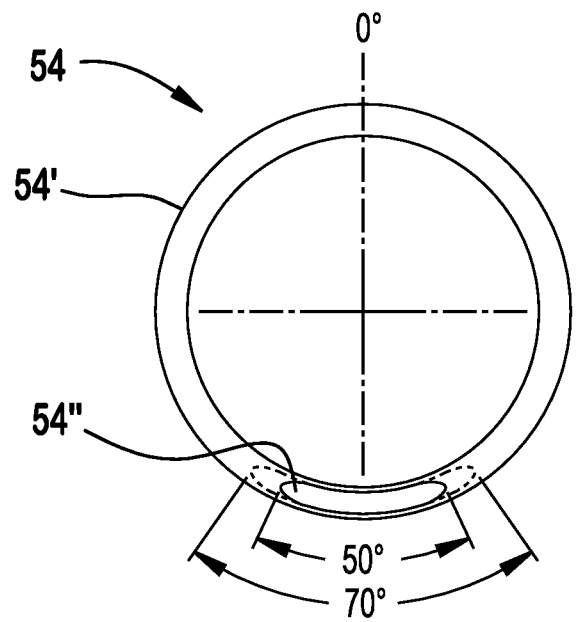
Figure 4F:
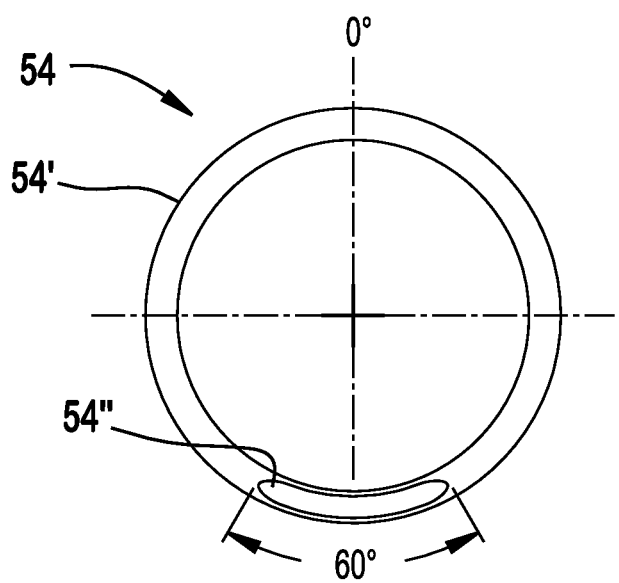

With reference to FIG. 1, a wheel hub assembly according to a preferred embodiment of the invention is denoted overall by 10. The figure shows a detail of the configuration provided by way of example.

The assembly 10 has a central rotation axis X and comprises a hub 20 which is rotating and a bearing unit 30 in turn comprising:

a stationary radially outer ring 31;

a radially inner ring 22 defined by the hub 20;

a further, rotating, radially inner ring 34 mounted on and integral with the hub 20;

two rows of rolling bodies 32, 33, in this example balls, arranged between the radially outer ring 31 and the radially inner rings 22 and 34; and two cages 39 and 40 for keeping in position the rolling bodies of the rows of rolling bodies 32, 33.

In the whole of the present description and the claims, the terms and expressions indicating positions and orientations such as "radial" and "axial" are understood as referring to the central axis of rotation X of the bearing unit 30. Expressions such as "axially outer" and "axially inner" refer instead to the assembled condition of the wheel hub assembly and, in the specific case, preferably refer to a wheel side and, respectively, to a side opposite to the wheel side.

The radially outer ring 31 is provided with two respective radially outer raceways 31', while the radially inner rings 22, 34 are provided with respective radially inner raceways 20', 34' for allowing rolling of the rows of axially outer rolling bodies 32 arranged between the radially outer ring 31 and the hub 20 and the row of axially inner rolling bodies 33 between the radially outer ring 31 and the radially inner ring 34. For the sake of simpler illustration the reference numbers 32, 33 will be used to indicate both the single balls and rows of balls.

Again for the sake of simplicity, the term "ball" may be used by way of example in the present description and in the attached drawings instead of the more generic term "rolling body" (and likewise the same reference numbers will also be used). The wheel hub assembly 10 is provided with at least one sealing device 50, for example, a device mounted on the axially outer side of the bearing unit. The comments made below with reference to the sealing device 50 will also be applicable to the sealing device 60 mounted on the axially inner side of the bearing unit.

With reference to FIG. 2a, the sealing device 50 may be a two-part cassette seal, comprising a static component 70, mounted on the radially outer ring 31, and a rotatable portion, mounted on the radially inner ring visible in the figure only in the shaped metallic shield 58. During the course of the present description, the static component 70 of the sealing device will essentially be considered, the component having, like the other components of the bearing unit, an axial symmetry, and therefore may be defined as being the top part of this static component 70, i.e. the part lying above the horizontal plane passing through the axis of symmetry X, i.e. basically the portion furthest from the ground. The remaining portion will be defined as the bottom part. This definition will be applied in the same way also to other components of the bearing unit 30, for example to the radially outer ring 31. FIG. 2a shows the top part of the sealing device, while FIG. 2b shows the bottom part thereof.

The static component 70 of the sealing device 50 comprises a shaped metallic support 51 on which a first lip 53 and a second lip 54 made of elastomeric material not making contact with the rotatable portion or the metallic shield 58 are co-moulded. The lips 53, 54 and the shield 58 define a volume 55 which is in contact with the external environment and inside which mud and/or other contaminants may accumulate. The static component 70 of the sealing device 50 is also provided with a pair of contacting lips 56, 57, again made of elastomeric material. These contacting lips make contact with the metallic shield 58 and define together with the shield an internal volume 59. In any case it is to be understood that the design, the arrangement and the quantity of the sealing lips could change without thereby departing from the scope of protection of the present invention.

The entry of mud inside the internal volume 59 is limited by the presence of a labyrinth seal formed by the second non-contacting lip 54 and by the metallic shield 58. However, both during operational working conditions and during the validation tests carried out on the bearing unit, it may happen that some of the mud enters inside the volume 59. With a solution such that described hitherto, it becomes difficult to drain the mud from the labyrinth seal and therefore mud accumulates inside this volume 59 and negatively affects the performance of the bearing unit. In FIG. 2b, which shows the bottom part of the static component 70 of the sealing device 50, it is possible to see the novel feature according to the present invention, in a first embodiment. The second non-contacting lip 54 is not formed over all the 360 degrees but only over a part thereof. In this way, an opening is created in the bottom part of the sealing device 50 of the labyrinth seal between the lip 54 and the shield 58. Therefore, the mud or other contaminant which, as a result of gravity, will tend to occupy the bottom part of the volume 59 will be able to escape easily from this volume 59. It is clear that the static component 70 must be mounted on the radially outer ring 31, directed correctly, namely so that the top part of the non-contacting second lip 54 corresponds to the top part of the radially outer ring 31. Depending on the application and the conditions of use, the angular extension of the missing part of the lip 54 may vary from 160° to 200° and preferably be equal to 180°. In the case of more demanding applications, the solid angular portion of the lip 54 will tend to increase so as to improve the associated labyrinth seal, and therefore the angular extension of the opening or missing part of the lip 54 may vary from 50° to 70° and preferably be equal to 60°.

FIGS. 3 and 4 show a second embodiment of the present invention. As can be seen in FIG. 4, the second non-contacting lip 54 is formed by an alternating sequence of solid portions 54' and voids 54", thus performing, more or less in the same manner as the embodiment of FIG. 2, the dual function of a labyrinth seal with its portions 54' and of drainage with the remaining portions 54". The angular extension of each solid portion 54' and each void 54" may be comprised between 20° and 30°, where the bottom limit is dependent upon the current moulding technologies. Consequently, the number of solid portions and corresponding voids will be between nine and six. Obviously, with this second embodiment of the invention, there is no need for directional mounting of the static component 70 of the sealing device on the radially inner ring 31.

Figure 5:
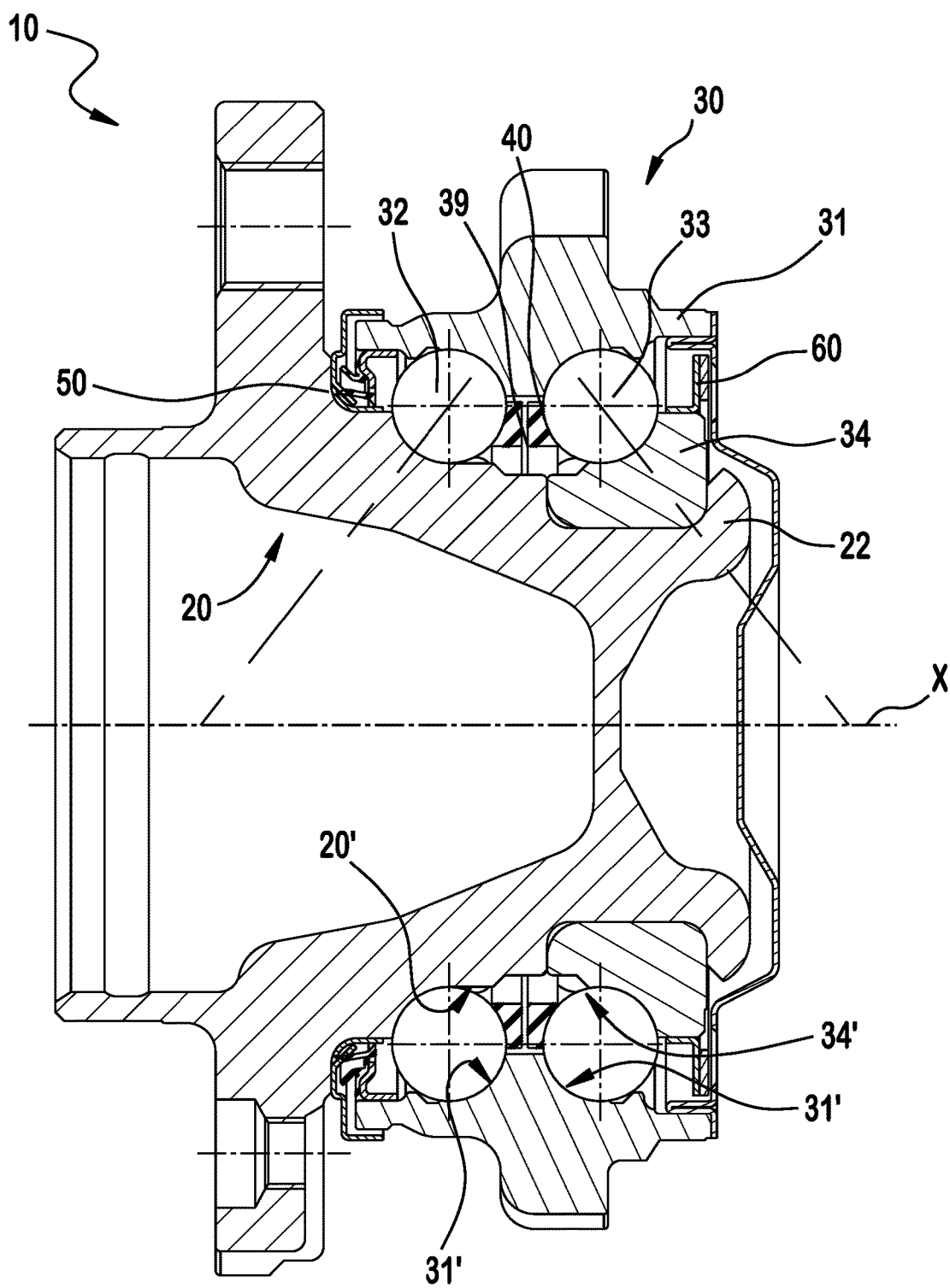
FIG. 5 is a partially cross-sectioned view of a wheel hub assembly provided with a sealing device.

With reference to FIG. 5, a wheel hub assembly according to an alternative preferred embodiment of the invention is denoted overall by 10'.

To summarize, this solution, defined in the best manner depending on the motor vehicle application, ensures a greater efficiency owing to the improved sealing performance in the field, avoiding noise-related problems due to the accumulation of mud. Obviously it ensures a better performance also on swampy and/or muddy road surfaces.

In addition to the embodiments of the invention, as described above, it is understood that there exist numerous further variants. It must also be understood that the embodiments are provided only by way of example and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

The invention claimed is:

1. A sealing device for a bearing unit, the sealing device having an axis of rotation and comprising:
   a static component configured for placement on a non-rotatable outer ring, the static component comprising a reinforcement support configured to abut the outer ring and elastomeric material disposed on the reinforcement support, the elastomeric material forming a first lip and a second lip;
   a shield configured for placement on at least one of a rotatable hub and a rotatable inner ring;
   wherein the first and second lip are configured to have an equilibrium position in which the first lip and the second lip do not contact the metallic shield;
   wherein the first lip and the shield define a volume located radially therebetween;
   the elastomeric material forming a third lip that contacts the shield to, in combination with the shield, form an internal volume of the sealing device, the internal volume being located radially inside of the first and second lip;
   the second lip and the shield are configured to define a labyrinth seal which is in communication with the internal volume;
   the second lip, when viewed in a direction parallel to the axis of rotation of the sealing device, does not extend a full three hundred sixty degrees (360°) around the axis of rotation to create at least one channel to facilitate the drainage of contaminants from the internal volume of the sealing device to the volume between the first lip and the shield.

2. The sealing device according to claim 1, wherein the at least one channel comprises an opening which extends through an arc about the axis of rotation of between one hundred sixty degrees (160°) and two hundred degrees (200°).

3. The sealing device according to claim 2, wherein the arc equals one hundred eighty degrees (180°).

4. The sealing device according to claim 1, wherein the at least one channel comprises an opening which extends through an arc about the axis of rotation of between fifty degrees (50°) and seventy (70°).

5. The sealing device according to claim 4, wherein the arc equals sixty degrees (60°).

6. The sealing device according to claim 1, wherein the at least one channel comprises a plurality of openings separated by a plurality of solid portions of the second lip.

7. The sealing device according to claim 6, wherein the plurality of openings are nine in number and each extends through an arc about the axis of rotation equal to twenty degrees (20°).

8. The sealing device according to claim 6, wherein the plurality of openings are six in number and each extends through an arc about the axis of rotation equal to thirty degrees (30°).

9. A bearing unit comprising:
   an outer ring; and
   a sealing device of claim 1, wherein the reinforcement support is disposed on the outer ring.

10. A wheel hub assembly for motor vehicles, comprising:
    a hub, and
    a bearing unit disposed on the hub, the bearing unit, comprising:
    an outer ring; and
    a sealing device of claim 1, wherein the reinforcement support is disposed on the outer ring.

* * * * *